Feb. 14, 1956  G. G. HARPER  2,734,536
COLLAPSIBLE BUCK SAW
Filed April 29, 1953  2 Sheets-Sheet 1
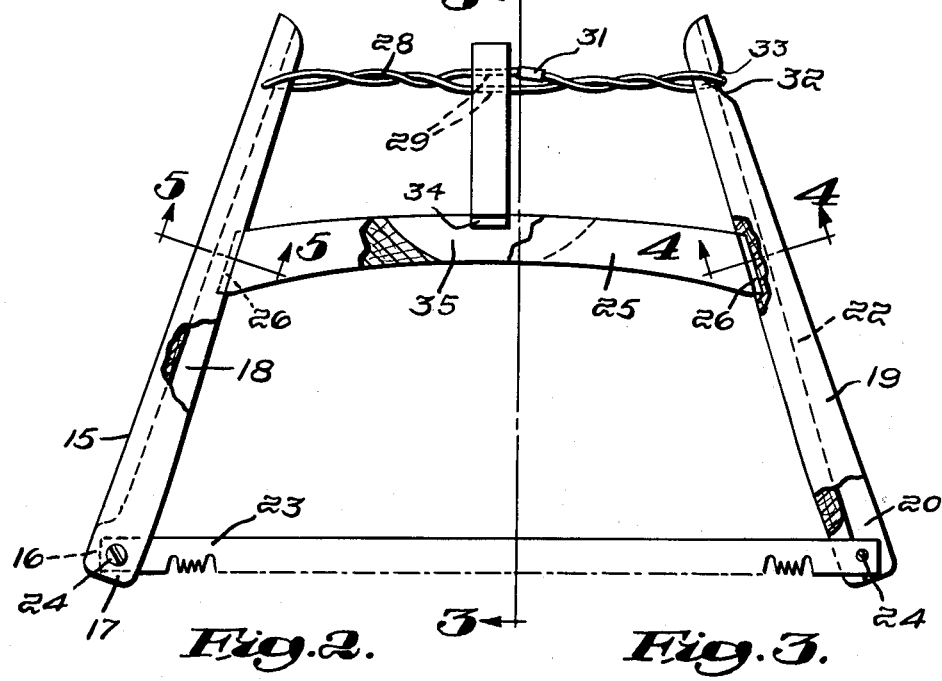
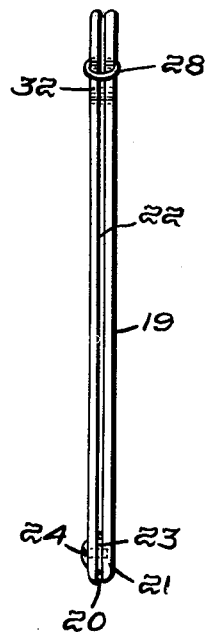
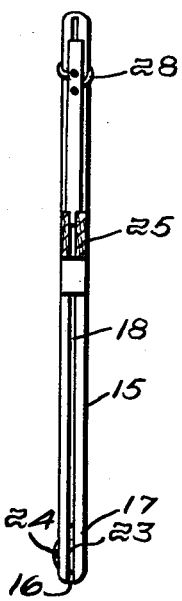
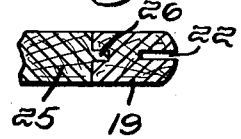
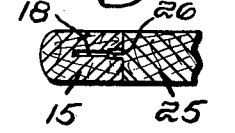
Inventor:
George Gale Harper,
by Abbott & Spear
Attorney

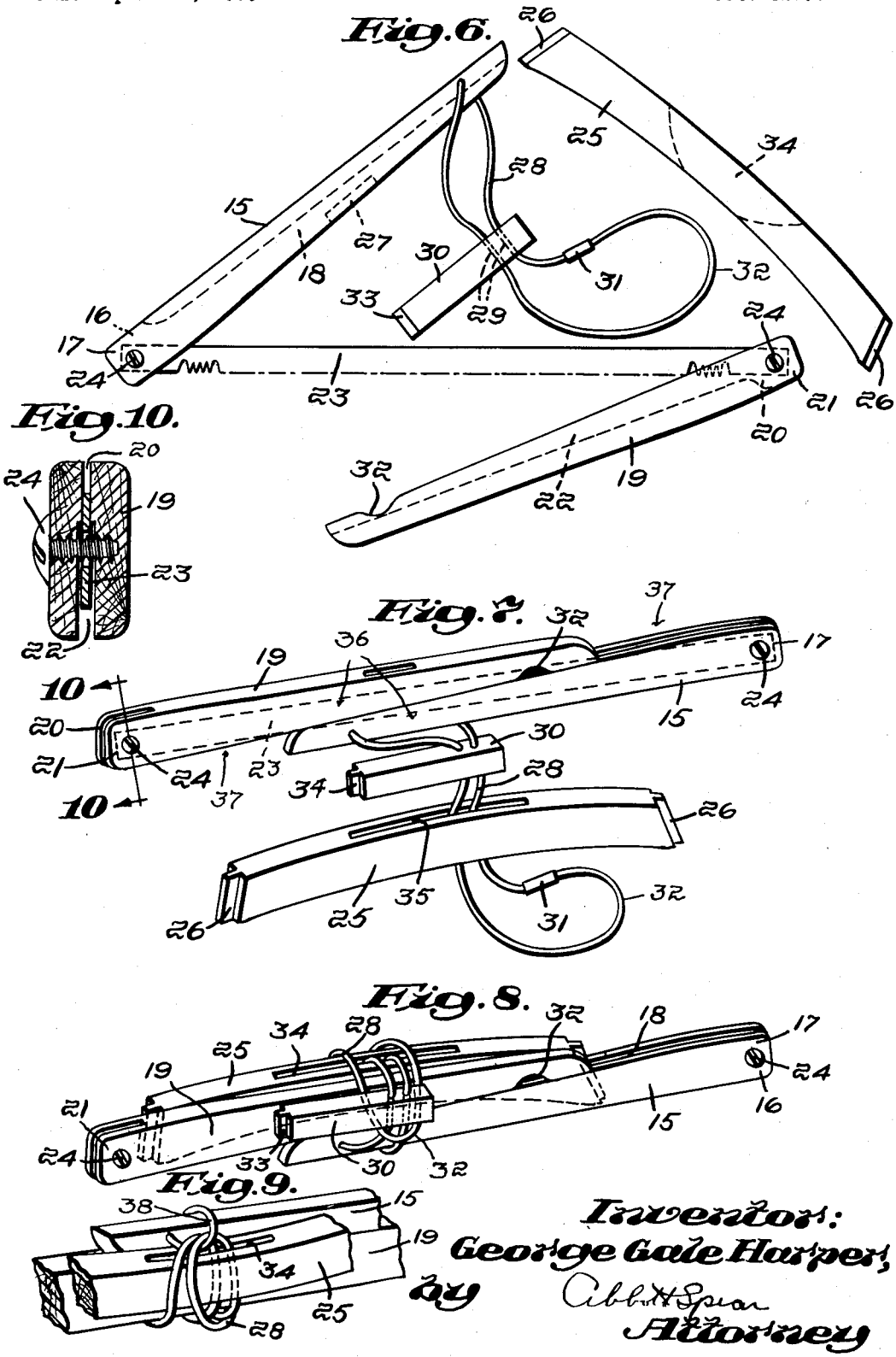

United States Patent Office 2,734,536
Patented Feb. 14, 1956

2,734,536

COLLAPSIBLE BUCK SAW

George Gale Harper, Waban, Mass.

Application April 29, 1953, Serial No. 351,782

5 Claims. (Cl. 145—32)

This invention relates to saws, particularly those of the buck saw type, and to frame constructions ensuring effectiveness in use and adapted to be collapsed compactly for convenience and safety in transportation and storage.

For those entering the woods, for example, on hunting, fishing or camping trips, a buck saw would be a most desirable piece of equipment were it not for such objectionable features to packing it as its relative bulk and the necessity of shielding its blade to eliminate the risk of personal injury, dulling its teeth, and damage to other equipment.

One general objective of the present invention is to provide a collapsible saw of the buck saw type constructed for efficient and effective use and whose frame is so made that its handles, while remaining connected to the blade, may be disposed against opposite edges of the blade with said edges entering slots extending along the blade engaging edges of the handles and with the teeth being effectively shielded. Additional general objectives are related to ease of assembly and disassembly of the saw and to its packaging.

In accordance with the invention, a saw is provided with a first handle having a slot dividing one of its ends and continuing along its inner edge to the other end thereof and a second handle having a slot dividing one of its ends and continuing along its outer edge to the other end thereof. Both of said slots are wide enough to receive the blade whose ends are pivotally connected between the divided ends of the handles. Means are provided to tension the blades against a detachable handle brace when the saw is assembled for use. These means are detachable from at least one of the handles to permit the removal of the brace and the handles then to be swung, both in the same direction, towards opposite edges of the blade with the blade entering its receiving slots thus to be suitably housed by the handles.

In preferred embodiments of the invention, the handles are of lesser length than the blade but of sufficient length to partly overlap when disposed in blade housing relation. In the zone of overlap, the handles are of such width that the slots in both of them are required to accommodate the blade. The remaining portion of each handle is of increased width and the slot therein is of such depth that the full width of the saw blade may be accommodated therein at least through a substantial part thereof.

In the accompanying drawings, there is shown an illustrative embodiment of the invention from which these and other of its objectives, novel features and advantages will be readily apparent.

In the drawings

Fig. 1 is an elevational view of a saw in accordance with the invention;

Fig. 2 is an end view of the right hand end of the saw as shown in Fig. 1;

Figs. 3, 4, and 5 are sections taken, respectively, along the indicated lines 3—3, 4—4, and 5—5 of Fig. 1;

Fig. 6 is an elevational view illustrating the disassembly of the saw;

Fig. 7 is a view, in perspective, of the saw collapsed;

Fig. 8 is a like view of the collapsed saw with its parts securely united;

Fig. 9 is a fragmentary view of the saw when united as shown in Fig. 8 and as seen from the opposite side; and Fig. 10 is a section along the indicated lines 10—10 of Fig. 7.

In the embodiment of the invention shown in the drawings, a first handle 15 has a transverse slot 16 dividing one of its ends as at 17 and intersected by a slightly wider slot 18 which continues along the inner edge to the other end thereof. A second handle 19 has a transverse slot 20 dividing one of its ends as at 21 and intersected by a somewhat wider slot 22 which continues along its outer edge to the other end thereof.

The ends of the saw blade 23 are pivotally connected to the divided ends of the saw handles 15 and 19 by pivots 24. The width of the transverse slots is equal to the thickness of the blade 23. While the saw frame may be constructed from other suitable stock, it is shown as being made from wood and in order that the divided ends of its handles will remain properly spaced, it is desirable that the pivots 24 be self-threading screws.

A brace is indicated at 25 and, while it may be otherwise detachably connected to the handles 15 and 19, it is shown as having its ends formed as tenons 26 entrant of mortices 27 with which the proximate edges of the handles are provided.

While any blade tensioning means may be used, it will be appreciated that the various uses to which saws in accordance with the invention are to be put makes it desirable that as many as possible of the saw parts be interconnected. For that reason, it is desirable that only one end of the blade tensioning means be detachable when the saw is disassembled so that it cannot be lost.

While a turnbuckle type of blade tensioning means is satisfactory for use in saws in accordance with the invention, it is not shown as the preferred manner of its connection to the handles will be apparent from the tensioning means detailed in the drawings and consisting of a multi-strand twisted wire 28 having a suitable plastic coat. Vinyl resin coats have proved satisfactory. The wire 28 extends through a hole in the upper end of the handle 15 and through vertically spaced bores 29 in the twister 30. The ends of the wire 28 are joined by a connector 31 and the free loop 32 is adapted to be passed over the upper end of the handle 19 and to seat in its notch 33.

The twister 30 is then turned until the twisting of the wire 28 has suitably tensioned the blade 23 and its tenon 34 is then swung into the slot 35 with which the central part of the brace 25 is provided thus to establish the assembled saw shown in Fig. 1.

When the saw is to be disassembled, the twister 30 is swung clear of the brace slot 35 and the blade tension is so released as to enable, as will be apparent from Fig. 6, the brace to be removed and the handles then swung both in the same direction towards opposite deges of the blade 23. The slot 18 thus receives the back edge of the blade 23 while the slot 22 receives the toothed edge thereof. These slots are somewhat wider than the slots 16 and 20 to enable the edges of the blade to fit freely therein.

At this point, attention is directed to the fact that the handles are appreciably shorter than the blade 23 but are of sufficient length so that substantial portions overlap. As will be apparent from the drawings, the overlapping portions 36 (see Fig. 7) are narrower than the remaining portion, indicated at 37 in Fig. 7 of each handle so that both of their receiving slots are required to house the blade while in each of the portions 37, its width enables the slot to fully receive the saw blade.

It will be noted that the wire 28 passes through the handle 15 and the twister 30 so that the brace 25 is the only part that is completely separable. The collapsed saw may, however, be packaged as a unit by passing the free loop 32 of the tensioning wire 28 through the slot 35 of the brace 25 and by sliding the twister 30 towards the handle 15 as will be apparent from Fig. 7. This enables a short loop 38 (see Fig. 9) to be established on the side of the handle 15 opposite to the twister 30. With the brace 25 then disposed on the last named side, the free wire loop 32 may then be passed through the loop 38 and brought back to be caught under the twister 30 as shown in Fig. 8.

It will thus be apparent that the invention provides a collapsible buck saw in which the handles function to shield the teeth without being disconnected from the blade and which is adapted to be so constructed that its parts, when disassembled, are compactly arranged and securely interconnected.

What I therefore claim and desire to secure by Letters Patent is:

1. A buck saw frame for a saw blade of a predetermined length, first and second handles, said first handle having a slot dividing one of its ends and continuing along its inner edge to the other end thereof, said second handle having a slot dividing one of its ends and continuing along its outer edge to the other end thereof, the width of said slots being such as to accommodate said blade, means to pivotally connect the ends of said blade between the divided ends of said handles, a cross brace having a slot extending vertically through the central part thereof and detachably connected to said handles between their ends, and adjustable blade tensioning means comprising a flexible loop extending through the other end of one of said handles and removably disposed around the other end of the other handle, and a twister slidably supported by said loop and including a part entrant of said brace slot to hold said blade tensioning means operative but releasable therefrom to enable the blade tension to be eased and the loop removed from one handle thus to enable said brace to be removed and said handles to be swung both in the same direction to receive opposite edges of an attached blade in their slots in such a manner as to shield its teeth, and the free end of the loop to be passed through said brace and used to work together the collapsed saw frame and attached blade.

2. A buck saw frame for a saw blade of predetermined length, said frame comprising first and second handles, the length of each handle being less than that of the blade but more than half thereof, said first handle having a slot dividing one of its ends and continuing along its inner edge to the other end thereof, said second handle having a slot dividing one of its ends and continuing along its outer edge to the other end thereof, the width of said slots being such as to accommodate said blade, means to pivotally connect the ends of said blade between the divided ends of said handles, a cross brace detachedly connected to said handles between their ends, and adjustable blade tensioning means interconnecting said other ends of said handles and releasable from at least one of them to enable said brace to be removed and said handles to be swung both in the same direction to bring them into overlapping engagement with opposite edges of an attached blade received in their slots and its teeth shielded.

3. A buck saw frame for a saw blade of predetermined length, said frame comprising first and second handles, the length of each handle being less than that of the blade but more than half thereof, said first handle having a slot dividing one of its ends and continuing along its inner edge to the other end thereof, said second handle having a slot dividing one of its ends and continuing along its outer edge to the other end thereof, the width of said slots being such as to accommodate said blade, means to pivotally connect the ends of said blade between the divided ends of said handles, a cross brace detachedly connected to said handles between their ends, and adjustable blade tensioning means interconnecting said other ends of said handles and releasable from at least one of them to enable said brace to be removed and said handles to be swung both in the same direction to bring them into overlapping engagement with opposite edges of an attached blade received in their slots and its teeth shielded, the width of said handles and the depth of their slots being such as to require both handles to house the blade in the zone of their overlap and the width of the remaining portion of each handle and the depth of its slot being such that the blade may be housed therein.

4. A buck saw frame for a saw blade of predetermined length and thickness, said frame comprising first and second handles, the length of each handle being less than that of the blade but more than half thereof, said first handle having a slot dividing one of its ends and continuing along its inner edge to the other end thereof, said second handle having a slot dividing one of its ends and continuing along its outer edge to the other end thereof, the width of end dividing portions of said slots being approximately equal to said predetermined blade thickness and the width of the remaining portions of said slots being such as to freely accommodate said blade, means to pivotally connect the ends of said blade between the divided ends of said handles, a cross brace detachedly connected to said handles between their ends, and adjustable blade tensioning means interconnecting said other ends of said handles and releasable from at least one of them to enable said brace to be removed and said handles to be swung both in the same direction to bring them into overlapping engagement with opposite edges of an attached blade received in their slots and its teeth shielded.

5. A buck saw frame for a saw blade of predetermined length and thickness, said frame comprising first and second handles, the length of each handle being less than that of the blade but more than half thereof, said first handle having a slot dividing one of its ends and continuing along its inner edge to the other end thereof, the width of the end dividing portion of each slot being approximately equal to said predetermined blade thickness and said second handle having a slot dividing one of its ends and continuing along its outer edge to the other end thereof, the width of the remaining portion of said slots being such as to freely accommodate said blade, pivot means for the ends of said blade threaded through both walls of the divided ends of said handles, a cross brace detachedly connected to said handles between their ends, and adjustable blade tensioning means interconnecting said other ends of said handles and releasable from at least one of them to enable said brace to be removed and said handles to be swung both in the same direction to bring them into overlapping engagement with opposite edges of an attached blade received in their slots with its teeth shielded.

References Cited in the file of this patent

UNITED STATES PATENTS

| 104,847 | Harkin | June 28, 1870 |
| 923,543 | Luzatti | June 1, 1909 |
| 1,738,336 | Wahlberg et al. | Dec. 3, 1929 |

FOREIGN PATENTS

| 207,894 | Germany | Mar. 17, 1909 |